(12) United States Patent
Youn et al.

(10) Patent No.: US 11,376,976 B2
(45) Date of Patent: Jul. 5, 2022

(54) VEHICLE CHARGER AND METHOD FOR CONTROLLING THE SAME

(71) Applicants: HYUNDAI MOTOR COMPANY, Seoul (KR); KIA MOTORS CORPORATION, Seoul (KR)

(72) Inventors: Han Shin Youn, Seoul (KR); Ho Joong Lee, Anyang-si (KR); Hye Seung Kim, Gunpo-si (KR); Joon Young Jeon, Seoul (KR); Won Yong Sung, Suwon-si (KR); Dong Jun Lee, Suwon-si (KR); Young Jin Jang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 386 days.

(21) Appl. No.: 16/691,371

(22) Filed: Nov. 21, 2019

(65) Prior Publication Data

US 2021/0078423 A1    Mar. 18, 2021

(30) Foreign Application Priority Data

Sep. 18, 2019 (KR) .................. 10-2019-0114656

(51) Int. Cl.
| | |
|---|---|
| *B60L 53/22* | (2019.01) |
| *H02J 7/02* | (2016.01) |
| *H02M 3/158* | (2006.01) |
| *H02M 1/42* | (2007.01) |

(52) U.S. Cl.
CPC ............... *B60L 53/22* (2019.02); *H02J 7/02* (2013.01); *H02M 1/4225* (2013.01); *H02M 3/158* (2013.01); *B60L 2210/10* (2013.01); *H02J 2207/20* (2020.01)

(58) Field of Classification Search
CPC ...................................... B60L 53/22
USPC ........................................ 320/109
See application file for complete search history.

(56) References Cited

U.S. PATENT DOCUMENTS

2018/0278168 A1* 9/2018 Brown .................. H02J 7/022

FOREIGN PATENT DOCUMENTS

| | | |
|---|---|---|
| KR | 10-2014-0114175 A | 9/2014 |
| KR | 10-2016-0013551 A | 2/2016 |

* cited by examiner

*Primary Examiner* — Eric D Lee
(74) *Attorney, Agent, or Firm* — Morgan, Lewis & Bockius LLP

(57) ABSTRACT

A vehicle charger includes a power factor correction converter configured to correct the power factor of alternating current (AC) power is integrated with an input terminal of a DC-DC converter configured to generate a direct-current (DC) voltage having a magnitude required for an energy storage device in the vehicle, thereby reducing the size of the vehicle charger, reducing the number of required elements, and allowing the vehicle charger to have high efficiency; and a method for controlling the same.

12 Claims, 5 Drawing Sheets

VEHICLE CHARGER AND METHOD FOR CONTROLLING THE SAME

CROSS REFERENCE TO RELATED APPLICATION

The present application claims the benefit of priority to Korean Patent Application No. 10-2019-0114656, filed on Sep. 18, 2019 in the Korean Intellectual Property Office, the entire contents of which is incorporated herein by reference.

TECHNICAL FIELD

The present disclosure relates to a vehicle charger and a method for controlling the same and, more specifically, to: a vehicle charger wherein a power factor correction converter configured to correct the power factor of alternating current (AC) power is integrated with an input terminal of a DC-DC converter configured to generate a direct-current (DC) voltage having a magnitude required for an energy storage device in the vehicle, thereby reducing the size of the vehicle charger, reducing the number of required elements, and allowing the vehicle charger to have high efficiency; and a method for controlling the same.

BACKGROUND

As global warming and environmental pollution become serious problems, vigorous research and development has been made regarding eco-friendly vehicles capable of reducing environmental pollution as much as possible in the automobile industry field, and a market therefor is also becoming larger.

Examples of eco-friendly vehicles, which have been introduced worldwide, include hybrid vehicles, plugin hybrid vehicles, and electric vehicles, each of which has electric motor configured to generate a driving force by using electric energy instead of an engine configured to generate a driving force by combusting conventional fossil fuel. An electric vehicle and a plugin hybrid vehicle among the eco-friendly vehicles using electric energy charge a battery disposed therein by receiving power from an external charging facility connected to the grid, and produce kinetic energy necessary for vehicle driving by using power from the charged battery. Therefore, each of the eco-friendly vehicles has an on-board charger (OBC) configured to receive grid power from external charging facilities and convert the grid power into power for charging a battery. That is, the vehicle charger or the on-board charger (OBC) converts alternating-current (AC) grid power into DC power having a desired voltage, and provides the DC power to a high-voltage battery, which is an in-vehicle energy storage device, to charge the high-voltage battery.

The vehicle charger (OBC) may affect vehicle fuel efficiency and thus is required high efficiency power conversion. Structurally, the vehicle charger is disposed in an engine room of a vehicle and is thus required to be downsized and densified for efficient space arrangement.

The above information disclosed in this Background section is only for enhancement of understanding of the background of the present disclosure, and should not be taken as acknowledgement that this information forms the prior art that is already known to a person skilled in the art.

SUMMARY

The technical problem to be solved by the present disclosure is to provide a vehicle charger and a method for controlling the same, wherein the vehicle charger reduces the number of switching elements and driving circuits to enable the miniaturization and power densification thereof and has a high output and a wide input/output range.

To solve the technical problem, the present disclosure provides a vehicle charger including: an inductor having one end connected to one end of an alternating current (AC) power source; a first leg including a first switching element and a second switching element, which are connected to each other in series. Connection terminals of the first switching element and the second switching element are connected to the other end of the inductor. The vehicle charger further includes a capacitor connected to the first leg in parallel; a second leg including a third switching element and a fourth switching element, which are connected to each other in series between both ends of the capacitor. Connection terminals of the third switching element and the fourth switching element are connected to the other end of the AC power source. The vehicle charger further includes a transformer, which has a primary coil having one end connected to the connection terminals of the third switching element and the fourth switching element, and a secondary coil electromagnetically coupled to the primary coil; a third leg including a fifth switching element and a sixth switching element, which are connected to each other in series between both ends of the capacitor. Connection terminals of the fifth switching element and the sixth switching element are connected to the other end of the primary coil. The vehicle charger still further includes a controller configured to control the first and second switching elements in order to adjust a voltage of the capacitor, and configured to control the third and fourth switching elements in order to convert a magnitude of the voltage of the capacitor.

In one embodiment of the present disclosure, in order to adjust the voltage of the capacitor, the controller may determine duty ratios of the switching elements included in the first leg to control turn-on/off of the switching elements included in the first leg, may control turn-on/off of the switching elements included in the second leg by using switching frequencies synchronized with switching frequencies of the switching elements included in the first leg, and may control turn-on/off of the switching elements included in the third leg such that the switching elements included in the third leg have a phase difference therebetween, compared with the switching elements included in the second leg.

In one embodiment of the present disclosure, the controller may generate a detection voltage of the capacitor and a first reference voltage for making the detection voltage of the capacitor obey an externally input voltage command for the capacitor, and the first reference voltage may have the form of an alternating current synchronized with the alternating current of the AC power source.

In one embodiment of the present disclosure, the controller may compare the first reference voltage with a carrier signal having a triangular wave-shaped voltage having a predetermined period to determine duty ratios of the first switching element and the second switching element, and the first switching element and the second switching element may operate complementarily to each other.

In one embodiment of the present disclosure, the controller may compare the carrier signal with a second reference voltage having a magnitude corresponding to half of a peak value of the carrier signal to determine duty ratios of the third switching element and the fourth switching element, and the third switching element and the fourth switching element may operate complementarily to each other.

In one embodiment of the present disclosure, the controller may determine a phase difference for making an output voltage of the vehicle charger obey a predetermined output voltage command, and may control the fifth switching element and the sixth switching element to be delayed by the phase difference, compared with the third switching element and the fourth switching element.

In one embodiment of the present disclosure, the controller may include: a first subtractor configured to determine a first error between the detection voltage of the capacitor and the externally input voltage command for the capacitor; a first voltage controller configured to generate a direct current (DC) voltage control value for reducing the first error; a current command generator configured to generate a current command by multiplying the DC voltage control value, determined by the first voltage controller, by a phase component for the synchronization with the AC power source; a second subtractor configured to determine a second error between the current command and a detection current of the inductor; a current controller configured to determine a first reference voltage, which is used in determining the duty ratios of the first switching element and the second switching element of the first leg in order to reduce the second error and has the form of an alternating current synchronized with the alternating current of the AC power source; a triangular wave generator configured to generate a carrier signal, which is a triangular wave-shaped voltage having a predetermined period; a DC voltage source configured to generate a second reference voltage, which is a predetermined DC voltage having a magnitude corresponding to half of the peak value of the carrier signal; a first comparator configured to compare a magnitude of the first reference voltage with a magnitude of the carrier signal, determine the duty ratios of the first switching element and the second switching element, and output the determined duty ratios as a control signal for the first switching element and the second switching element; a second comparator configured to compare a magnitude of the second reference voltage with a magnitude of the carrier signal, determine the duty ratios of the third switching element and the fourth switching element, and output the determined duty ratios as a control signal for the third switching element and the fourth switching element; a third subtractor configured to determine a third error between the output voltage of the vehicle charger and the predetermined output voltage command; a second voltage controller configured to generate a current peak command for reducing the third error; a third comparator configured to output a result of comparison between a peak value of a primary-side current of the transformer and the current peak command; and a D flip-flop configured to delay an output of the second comparator based on an output of the third comparator and output the output of the second comparator as a control signal for the fifth switching element and the sixth switching element.

In one embodiment of the present disclosure, the vehicle charger may further include a rectifier connected to the secondary coil of the transformer and configured to rectify power induced by the secondary coil and output the rectified power to a device to be charged.

To achieve the above-described technical purpose, the present disclosure provides a method for controlling a vehicle charger, the method including: generating a detection voltage of the capacitor and a first reference voltage for making the detection voltage of the capacitor obey an externally input voltage command for the capacitor; generating a second reference voltage which is a DC voltage having a predetermined magnitude; comparing the first reference voltage with a carrier signal, which has a triangular wave-shaped voltage having a predetermined period, and determining duty ratios of the first switching element and the second switching element, which are opened/short-circuited complementarily to each other; comparing the second reference voltage with the carrier signal and determining a turn-on/off state of the third switching element and the fourth switching element, which are opened/short-circuited complementarily to each other; and determining a phase difference for making an output voltage of the vehicle charger obey a predetermined output voltage command, delaying the turn-on/off state of the third switching element and the fourth switching element by the phase difference, and determining a turn-on/off state of the fifth switching element and the sixth switching element.

In one embodiment of the present disclosure, the first reference voltage may have the form of an alternating current synchronized with the alternating current of the AC power source.

In one embodiment of the present disclosure, the second reference voltage may be a DC voltage having a magnitude corresponding to half of a peak value of the carrier signal.

In one embodiment of the present disclosure, the generating of the first reference voltage may include: an operation of determining a first error between the detection voltage of the capacitor and the externally input voltage command for the capacitor; a voltage control operation of generating a DC voltage control value for reducing the first error; a current command generation operation of generating of an AC current command by multiply the DC voltage control value determined in the voltage control operation by a phase component for the synchronization with the AC power source; an operation of determining a second error between the current command and a detection current of the inductor; and a current control operation of determining the first reference voltage having the form of an alternating current synchronized with the alternating current of the AC power source in order to reduce the second error.

In one embodiment of the present disclosure, in the determining of the turn-on/off state of the fifth switching element and the sixth switching element, in relation to a third error between the output voltage of the vehicle charger and the predetermined output voltage command, an output of the second comparator may be delayed based on a result of comparison between a current peak command for reducing the third error and a peak value of a primary-side current of the transformer and may be output as a control signal for the fifth switching element and the sixth switching element.

According to the vehicle charger and the method for controlling the same, the vehicle charger may have a high price competitiveness by reducing the number of switches and driving circuits through the integration of a power factor correction circuit and a phase shift full bridge DC-DC converter, which are required for the vehicle charger, and may achieve high power density through the simple structure thereof.

Particularly, according to the vehicle charger and the method for controlling the same, six switches may be controlled at the same time to operate a continuous conduction mode boost power factor correction circuit and a phase shift full bridge converter, thereby improving an output of the vehicle charger and extending an input/output voltage range.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, with reference to accompanying drawings, a more detailed description will be made of a vehicle charger and a method for controlling the same according to various embodiments of the present disclosure.

Figure 1:
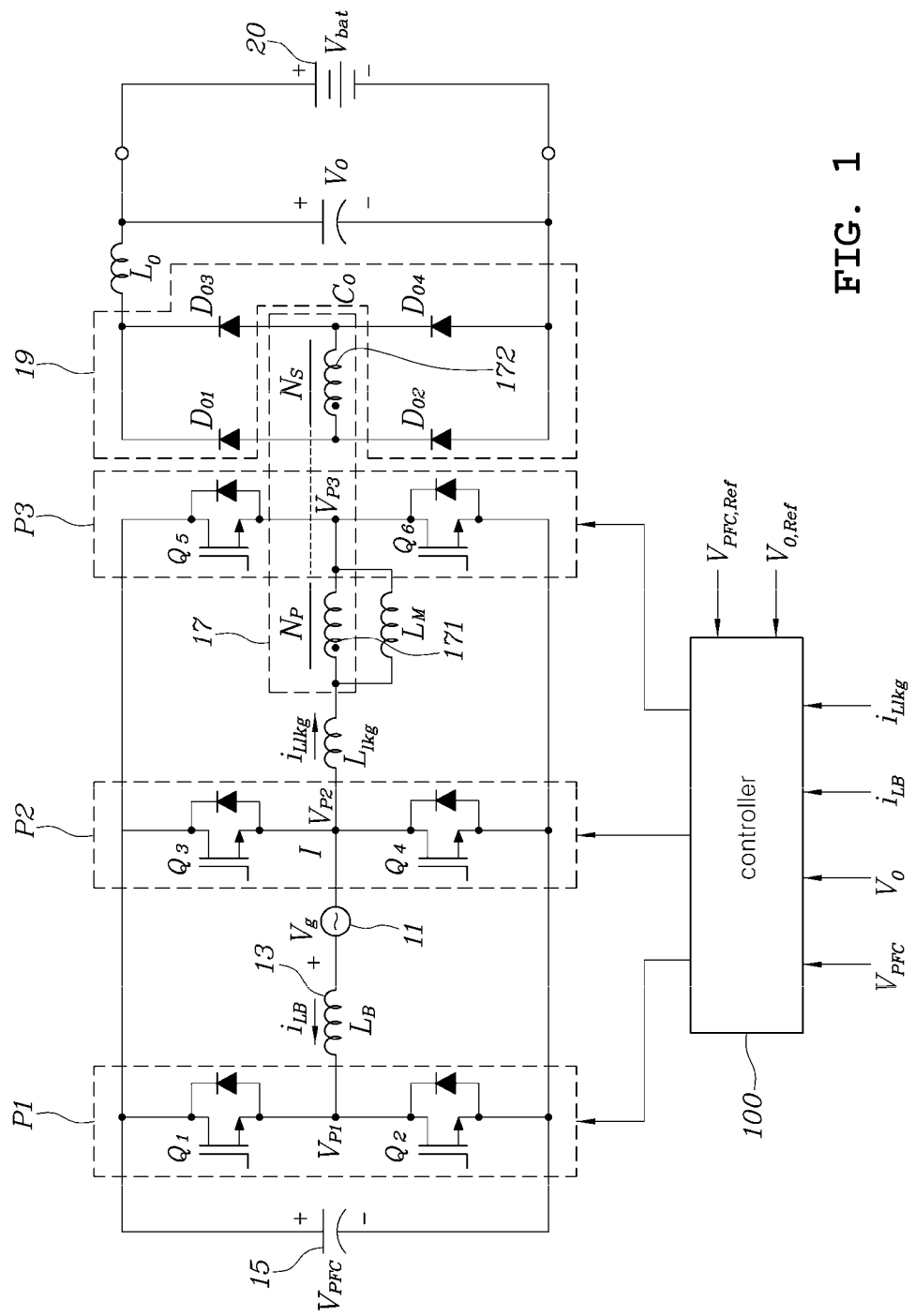
FIG. 1 is a circuit diagram of a vehicle charger according to one exemplary embodiment of the present disclosure.

FIG. 1 is a circuit diagram of a vehicle charger according to one embodiment of the present disclosure.

Referring to FIG. 1, a vehicle charger according to one embodiment of the present disclosure may include: an inductor 13 connected to one end of an alternating current (AC) power source 11; a first leg P1 including a first switching element $Q_1$ and a second switching element $Q_2$, which are commonly connected to the other end of the inductor 13; a capacitor connected in parallel to the first leg P1; a second leg P2 connected to in parallel to the capacitor 15 and including a third switching element $Q_3$ and a fourth switching element $Q_4$ which are commonly connected to the other end of the AC power source 11; a third leg P3 including a fifth switching element $Q_5$ and a sixth switching element $Q_6$ which are connected to each other in series between both ends of the capacitor 15; a transformer 17, which includes a primary coil 171 having one end connected to connection terminals of the third switching element $Q_3$ and the fourth switching element $Q_4$, and the other end connected to connection terminals of the fifth switching element $Q_5$ and the sixth switching element $Q_6$; a rectifier 19 implemented as multiple diodes $D_{01}$ to $D_{04}$ so as to rectify an output of a secondary coil 172 of the transformer 17 and provide the rectified output to an energy storage device 20 to be charged; and a controller 100 configured to control opening/short-circuiting of the switching elements $Q_1$ to $Q_6$ included in the first leg to the third leg, P1 to P3.

The vehicle charger according to one embodiment of the present disclosure, as configured above, has a charger structure in which a phase shift full bridge (PSHB) DC-DC converter is integrated with a continuous conduction mode (CCM) boost power factor correction circuit having no bridge circuit.

In the vehicle charger according to one embodiment of the present disclosure, the switching elements $Q_1$ and $Q_2$ included in the first leg P1 may be used to control the continuous conduction mode (CCM) boost power factor correction circuit having no bridge circuit which generates a DC voltage ($V_{PFC}$) for the capacitor 15. That is, the controller 100 may control the opening/short-circuiting of the switching elements $Q_1$ and $Q_2$ included in the first leg P1 to determine the voltage ($V_{PFC}$) of the capacitor 15 as a desired value.

Further, the switching elements $Q_3$ and $Q_4$ included in the second leg P2 and the switching elements $Q_5$ and $Q_6$ included in the second leg P3 may be used to control the phase shift full bridge DC-DC converter for converting a DC voltage ($V_{PFC}$) generated in the capacitor 15 into desired magnitude. In one embodiment of the present disclosure, the controller 100 may control opening/short-circuiting of the switching elements $Q_1$ to $Q_6$ included in the first leg to the third leg, P1 to P3, such that desired power can be provided to the energy storage device 20 to be charged.

An operation of a vehicle charger according to one embodiment of the present disclosure and a method for controlling the vehicle charger according to one embodiment of the present disclosure may be performed by the controller 100. Therefore, hereinafter, a more detailed description will be made of a more detailed configuration of the controller 100 and a flow of a control performed by the controller 100.

Figure 2:
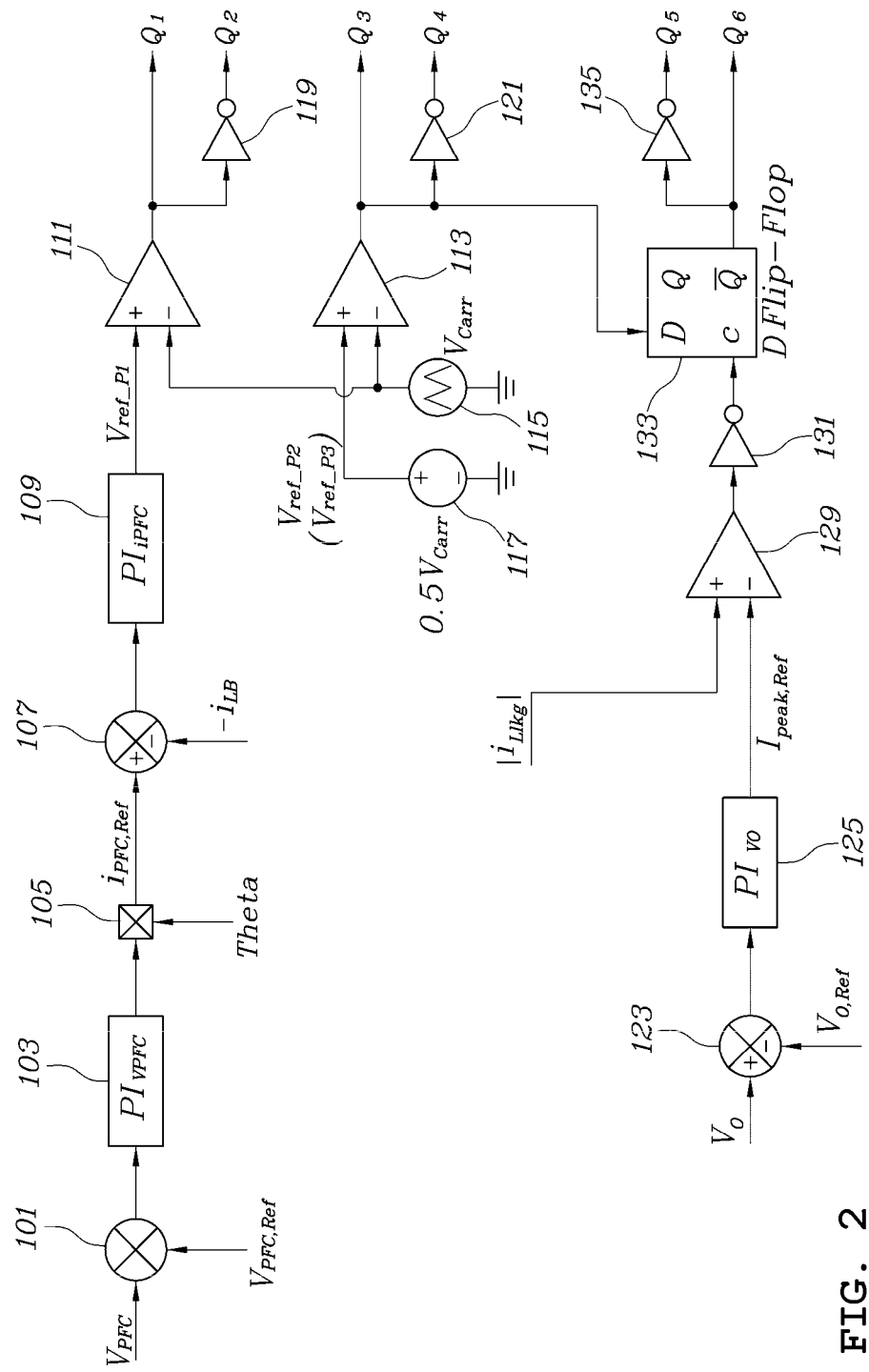
FIG. 2 is a block-configuration diagram more specifically illustrating a controller of a vehicle charger according to one embodiment of the present disclosure.

FIG. 2 is a block-configuration diagram more specifically illustrating a controller of a vehicle charger according to one embodiment of the present disclosure. A charging method for a vehicle according to one embodiment of the present disclosure may be performed blocks in the controller 100 illustrated in FIG. 2.

The controller 100 may include a processor performing various functions of the following modules 120, 130, 140 and 150. The modules 101, 103, 105, 107, 109, 111, 113, 115, 117, 123, 125, 129, 131, 133 and 135 described below may be implemented with software instructions executed on the processor. The controller 100 may include: a subtractor 101 configured to determine an error between a capacitor detection voltage ($V_{PFC}$) obtained by measuring a voltage of the capacitor 15 and a capacitor voltage command ($V_{PFC,Ref}$) input by an external upper controller or the like; and a voltage controller 103 configured to generate a DC voltage control value for minimizing the error between the capacitor detection voltage ($V_{PFC}$) and the capacitor voltage command ($V_{PFC,Ref}$), that is, so as to make the capacitor detection voltage ($V_{PFC}$) obey the capacitor voltage command ($V_{PFC,Ref}$).

The voltage controller 103 may generate a voltage control value for minimizing the error between the capacitor detection voltage ($V_{PFC}$) and the capacitor voltage command ($V_{PFC,Ref}$) by selectively using the control techniques well-known in the corresponding technical field: a proportional control, in which the error between the capacitor detection voltage ($V_{PFC}$) and the capacitor voltage command ($V_{PFC,Ref}$) is multiplied by the proportional constant; an integral control, in which the error between the capacitor detection voltage ($V_{PFC}$) and the capacitor voltage command ($V_{PFC,Ref}$) is integrated; and a derivative control, in which the error between the capacitor detection voltage ($V_{PFC}$) and the capacitor voltage command ($V_{PFC,Ref}$) is differentiated. In FIG. 2 illustrates an example of a proportional-integral (PI) controller.

Further, the controller 100 may further include: a current command generator 105 configured to generate an AC current command ($i_{PFC,Ref}$) by multiplying the DC voltage control value, generated by the voltage controller 103, by a phase component (Theta) for the synchronization with a power current provided by the AC power source 11; a subtractor 107 configured to determine the error between an inductor detection current ($i_{LB}$) obtained by measuring a current provided to the first leg P1 and the current command ($i_{PFC,Ref}$) generated by the current command generator 105; and a current controller 109 configured to determine a reference voltage ($V_{ref\_P1}$) used in determining the duty ratios of the switching elements $Q_1$ and $Q_2$ of the first leg P1 for minimizing the error between the inductor detection current ($i_{LB}$) and the current command ($i_{PFC,Ref}$) generated by the current command generator 105.

The current command generator 105 may be implemented as a subtractor configured to receive the phase component (Theta) for the synchronization with a power current provided by the AC power source 11 and multiply the DC voltage control value determined by the voltage controller 103 by the phase component (Theta). The phase component (Theta) may be determined by regularizing the magnitude of AC power as a value of 1, or may be derived by a normal phase calculation technique or phase detection technique known in the corresponding technical field, such as a technique of detecting a phase component through an external phase component detector (PLL).

The current controller 109 may also determine a reference voltage ($V_{ref\_P1}$) used in determining the duty ratios of the switching elements $Q_1$ and $Q_2$ for minimizing the error between the inductor detection current ($i_{LB}$) and the current command ($i_{PFC,Ref}$) by selectively using the proportional control, the integral control, and the derivative control widely known in the corresponding technical field. FIG. 2 illustrates an example in which the current controller 109 is implemented as a proportional-integral (PI) controller.

The reference voltage ($V_{ref\_P1}$) generated by the current controller 109 has been generated by comparing the current command ($i_{PFC,Ref}$) synchronized with a power current from the AC power source 11 with the current ($i_{LB}$) flowing in the inductor 13. Therefore, the reference voltage ($V_{ref\_P1}$) may also be provided in the form of a voltage synchronized with a power current from the AC power source 11.

In addition, the controller 100 may further include: a first comparator 111 configured to compare the reference voltage ($V_{ref\_P1}$) (hereinafter, referred to as a "first reference voltage") generated by the current controller 109 with a carrier signal ($V_{carr}$) which is a triangular wave-shaped voltage signal having a predetermined frequency and amplitude; and a second comparator 113 configured to compare the carrier signal ($V_{carr}$) with a reference voltage ($V_{ref\_P2}$) (hereinafter, referred to as a "second reference voltage") having a predetermined magnitude.

The controller 100 may further include: a triangular wave generator 115 configured to generate the carrier signal ($V_{carr}$); and a DC voltage source 117 configured to generate the second reference voltage ($V_{ref\_P2}$) having a predetermined magnitude.

An output from the first comparator 111 may be provided to the first switching element $Q_1$, and the output from the first comparator 111, which has been inverted by an inverting buffer 119, may be provided to the second switching element $Q_2$. Likewise, an output from the second comparator 113 may be provided to the third switching element $Q_3$, and the output from the second comparator 113, which has been inverted by an inverting buffer 121, may be provided to the fourth switching element $Q_4$.

The first comparator 111 and the second comparator 113 can output a HIGH signal when the first reference voltage ($V_{ref\_P1}$) and the second reference voltage ($V_{ref\_P2}$) have values larger than that of a carrier signal and can output a LOW signal when the first reference voltage ($V_{ref\_P1}$) and the second reference voltage ($V_{ref\_P2}$) have values smaller than that of the carrier signal, and vice versa.

As described above, the first switching element $Q_1$ and second switching element $Q_2$ of the first leg P1 are used in determining the voltage of the capacitor 15 and the current of the inductor 13, and the third switching element $Q_3$ and the fourth switching element $Q_4$ of the second leg P2 operate at a duty ratio of 0.5, and operate while being synchronized with switching frequencies of the first switching element $Q_1$ and the second switching element $Q_2$. Further, the third switching element $Q_3$ and the fourth switching element $Q_4$ has a duty ratio of 0.5 in a fixed frequency and thus may serve as a leading leg of a phase shift full bridge converter which receives an input of the voltage ($V_{PPC}$) of the capacitor 15 and converts the magnitude thereof. The fifth switching element $Q_5$ and the sixth switching element $Q_6$ of the third leg P3 serve as a lagging leg of the phase shift full bridge converter, and may be controlled to be turned on/off depending on the result of controlling the magnitude of a phase shift of the phase shift full bridge converter based on a predetermined out voltage command ($V_{O,Ref}$) and the magnitude of a primary-side current ($i_{Likg}$) of the transformer 17.

To this end, the controller 100 may include: a subtractor 123 configured to generate the error between an output voltage ($V_O$) of the vehicle charger and a predetermined voltage command ($V_{O,Ref}$) for the energy storage device 20 to be charged; a voltage controller 125 configured to generate a current peak command ($I_{peak,Ref}$) for a current of the primary coil 171 of the transformer 17 so as to minimize the error between the output voltage ($V_O$) and the voltage command ($V_{O,Ref}$); a comparator 129 configured to compare a current ($i_{Llkg}$) flowing through the primary side of the transformer 17 with the current peak command ($I_{peak,Ref}$) output by the voltage controller 125; an inverting buffer 131 configured to invert an output of the comparator 129; a D flip-flop 133 configured to receive an output from the inverting buffer 131 through a clock input terminal and output an output value of the comparator 113 at the time point at which a signal provided through the clock input terminal becomes a rising edge; and an inverting buffer 135 configured to invert an output of an inverting output terminal ($\overline{Q}$) of the D flip-flop 133 and provide the same as a control signal for the fifth switching element $Q_5$. The output of the inverting output terminal ($\overline{Q}$) of the D flip-flop 133 may be provided as a control signal for the sixth switching element $Q_6$.

The voltage controller 125 may selectively apply a control technique widely known in the corresponding technical field, such as proportional control, integral control, derivative control, and control in which the control techniques are mixed. Further, the application of the inverting buffers 131 and 135, the selection of the input terminal of the comparator 129, and the selection of the input/output terminal of the D flip-flop 133 may be appropriately changed as needed, and some constituent elements may thus be omitted. The comparator 129 compares the current peak command ($I_{peak,Ref}$) with the current ($i_{Llkg}$) flowing at the primary-side of the transformer 17. The comparator 129 generates a pulse waveform according to the result of the comparison. The D flip-flop 133 receives the pulse waveform output by the comparator 129 through the clock input terminal, and outputs the output of the second comparator 113 as it is at a rising edge or falling edge of the pulse waveform, or inverts and then output the same. In the example in FIG. 2, the D flip-flop 133 may invert and output the output of the second comparator 113 by means of the inverting output terminal ($\overline{Q}$).

Figure 3:
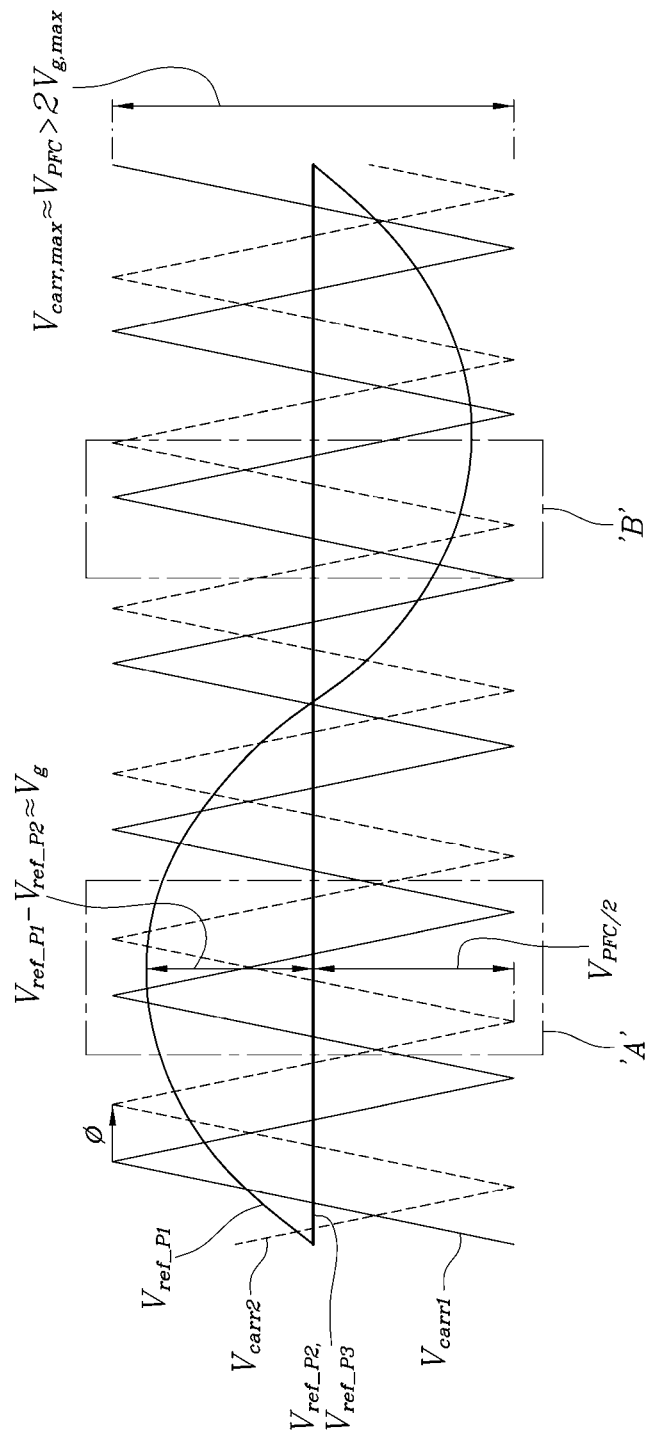
FIG. 3 illustrates an example in which a controller of a vehicle charger compares a reference voltage with a carrier signal and determines the duty ratio of a switching element based on the comparison according to one embodiment of the present disclosure.

FIG. 3 illustrates an example in which a controller of a vehicle charger compares a reference voltage with a carrier signal and determines the duty ratio of a switching element based on the comparison according to one embodiment of the present disclosure.

Referring to FIG. 2 and FIG. 3, when the reference voltages ($V_{ref\_P1}$ and $V_{ref\_P2}$) for controlling respective switching elements of the legs P1 and P2 are larger than a voltage ($V_{carr1}$) of a carrier signal, the upper switching elements $Q_1$ and $Q_3$ of the legs P1 and P2 are short-circuited by HIGH signals output by the comparators 111 and 113 of the controller 100, respectively, and the lower switching elements $Q_2$ and $Q_4$ are opened by LOW signals output by the inverting buffers 119 and 121, respectively. On the other hand, the reference voltages ($V_{ref\_P1}$ and $V_{ref\_P2}$) are smaller than the voltage of the carrier signal, the upper switching elements $Q_1$ and $Q_3$ of the legs P1 and P2 are opened by LOW signals output by the comparators 111 and 113 of the controller 100, respectively, and the lower switching elements $Q_2$ and $Q_4$ are short-circuited by HIGH signals output by the inverting buffers 119 and 121, respectively.

Similarly, a third reference voltage ($V_{ref\_P3}$) for controlling the switching elements of the leg P3 may be considered to be identical to the second reference voltage ($V_{ref\_P2}$), and the switching thereof may be considered to be shifted by a phase ($\varphi$), compared with the switching elements of the leg P2. Therefore, the reference voltage ($V_{ref\_P3}$) is compared with a carrier signal ($V_{carr2}$) obtained by shifting the carrier signal ($V_{carr1}$) by a phase ($\varphi$), so as to determine the turn-on/off of the switching elements $Q_5$ and $Q_6$.

Considering that the phase shift full bridge circuit operates at a duty ratio of 0.5, the second reference voltage ($V_{ref\_P2}$) and the third reference voltage ($V_{ref\_P3}$) may become half of peak values of voltages ($V_{carr1}$, $V_{carr2}$) of a carrier signal.

Since the reference voltage ($V_{ref\_P1}$) is generated by using a command generated by the current command generator 105 and synchronized with the phase (Theta) of AC power input from the AC power source, the controller 100 compares, in the first leg P1, the reference voltage ($V_{ref\_P1}$) having the form of an alternating current synchronized with an AC voltage ($V_g$) with a voltage ($V_{carr}$) of a carrier signal and drives a switch at an AC switching duty ratio to control a boost inductor ($L_B$) current in a continuous conduction mode.

Further, in the second leg P2, the controller 100 compares the DC-type reference voltage ($V_{ref\_P2}$) having a predetermined magnitude with the voltage ($V_{carr}$) of the carrier signal, and drives the switching elements $Q_3$ and $Q_4$ at a duty ratio of 0.5. In the third leg P3, the controller 100 drives the switching elements $Q_5$ and $Q_6$ with a phase shifted by $\varphi$ compared with the switching elements of the third leg P3. Therefore, the controller 100 controls the switching elements to operate as phase shift full bridge converts.

In the second leg P2, two switching elements $Q_3$ and $Q_4$ are operated at a duty ratio of 0.5, and thus the average voltage of a node, in which the two switching elements $Q_3$ and $Q_4$ are connected to each other, corresponds to half of the voltage ($V_{PFC}$) of the capacitor 15. The average voltage of a node, in which two switching elements $Q_1$ and $Q_2$ of the first leg P1 operated at an AC duty ratio are connected to each other, changes similarly to the AC input voltage ($v_g$) with reference to half of the voltage ($V_{PFC}$) of the capacitor 15.

As a result, the vehicle charger according to one embodiment of the present disclosure has a voltage of the capacitor 15, that is, a power factor correction circuit voltage ($V_{PFC}$), as in Equation 1. In relation to a final output voltage ($V_O$), an output voltage may be generated in proportion to the $V_{PFC}/2$ voltage and the turn ratio as in Equation 2 according to an operation of the phase shift full bridge converter $$V_{PFC} > 2*V_{g\_max} \quad \text{[Equation 1]}$$

$$V_O = 2*\varphi/(2*\pi)*V_{PFC}*(N_s/N_p) \approx 2*\text{Duty}*V_{PFC}*(N_s/N_p) \quad \text{[Equation 2]}$$

In Equations 1 and 2, $V_{PFC}$ indicates the voltage of the capacitor 15, $V_{g\_max}$ indicates a peak value of a voltage of the AC power source, $V_O$ indicates an output voltage of the vehicle charger, $N_p$ indicates the number of turns of the primary coil 171 of the transformer 17, and $N_s$ indicates the number of turns of the secondary coil 172 of the transformer 17.

Figure 4:
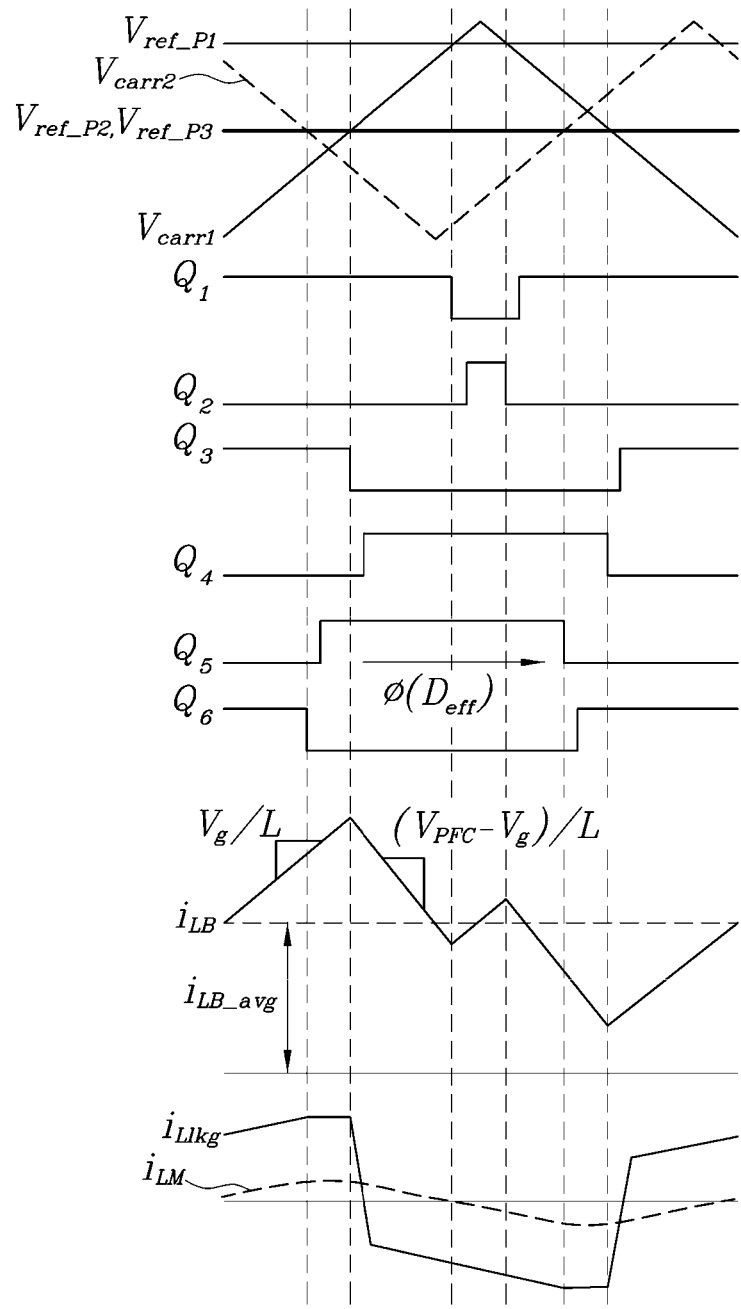
FIG. 4 and FIG. 5 illustrate a resonance current, an inductor current, and an opened/short-circuited state of a switching element in each of areas A and B corresponding to one cycle of a carrier signal illustrated in FIG. 3
Figure 5:
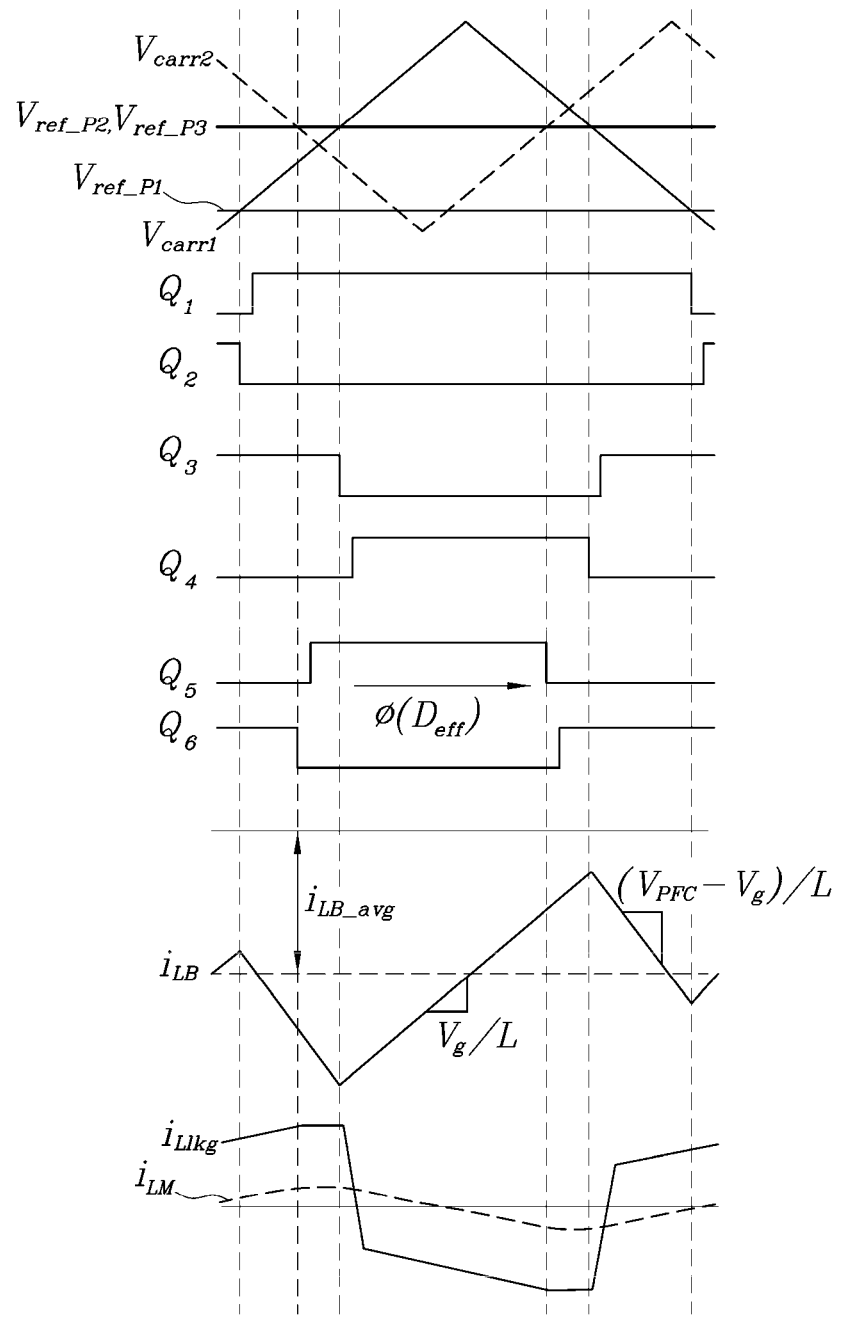

FIG. 4 and FIG. 5 illustrate a resonance current, an inductor current, and an opened/short-circuited state of a switching element in each of areas A and B corresponding to one period of a carrier signal illustrated in FIG. 3

As illustrated in FIGS. 4 and 5, as the first reference voltage ($V_{ref\_P1}$) changes, the duty ratios of the switching elements $Q_1$ and $Q_2$ of the first leg P1 are changed, and the switching elements $Q_3$ and $Q_4$ of the second leg P2 and the switching elements $Q_5$ and $Q_6$ of the third leg P3 operate at a duty ratio of 0.5 with a phase difference therebetween. A power voltage ($v_g$) of the AC power source and a voltage corresponding to the difference ($V_{PFC}-v_g$) between a capacitor voltage ($V_{PFC}$) and the voltage ($v_g$) of the AC power source are alternately applied to the boost inductor 13 depending on the short-circuited/opened state of the switching elements $Q_1$ to $Q_4$, thereby generating a current ripple, and an inductor current ($i_{LB}$) is generated in the continuous conduction mode (CCM). At the same time, the phase shift full bridge converter is driven by the short-circuiting/opening of the switching elements $Q_3$, $Q_4$, $Q_5$, and $Q_6$ operated at a duty ratio of 0.5, and a primary-side current ($i_{Llkg}$) and a magnetizing current ($i_{Lm}$) are generated by the phase difference ($\varphi$) between voltages ($V_{carr1}$ and $V_{carr2}$) of two carrier signals. The primary-side current ($i_{Llkg}$) and the magnetizing current ($i_{Lm}$) transfer power to a secondary side of the transformer 17 so as to generate an output voltage ($V_O$) as in Equation 2.

In one embodiment of the present disclosure, in relation to a current of the switching elements $Q_1$ and $Q_2$ of the first leg P1, the current ($i_{LB}$) of the boost inductor 13 flows according to switching operations as in Equation 3 below. Further, the current ($i_{LB}$) of the boost inductor 13 and the primary-side current ($i_{Llkg}$) flow through the switching elements $Q_3$ and $Q_4$ of the second leg P2 with the sum thereof as in Equation 4 below. The primary-side current ($i_{Llkg}$) flows through the switching elements $Q_5$ and $Q_6$ of the third leg P3 as in Equation 5 below.

$$i_{Q1} = i_{LB} \text{(when the switching element } Q_1 \text{ is turned on)}$$
$$i_{Q2} = i_{LB} \text{(when the switching element } Q_2 \text{ is turned on)} \quad \text{[Equation 3]}$$

$$i_{Q3} = i_{LB} + i_{Llkg} \text{(when the switching element } Q_3 \text{ is turned on)}$$
$$i_{Q4} = i_{LB} + i_{Llkg} \text{(when the switching element } Q_4 \text{ is turned on)} \quad \text{[Equation 4]}$$

$$i_{Q5} = i_{Llkg} \text{(when the switching element } Q_5 \text{ is turned on)}$$
$$i_{Q6} = i_{Llkg} \text{(when the switching element } Q_6 \text{ is turned on)} \quad \text{[Equation 5]}$$

In Equations 3 to 5, $i_{Q1}$ to $i_{Q6}$ indicate currents flowing through switching elements $Q_1$ to $Q_6$, respectively.

As described above, in various embodiments of the present disclosure, the vehicle charger may have a high price competitiveness by reducing switches and driving circuits through the integration of a power factor correction circuit and a phase shift full bridge DC-DC converter, which are required for the vehicle charger, and may achieve high power density through the simple structure thereof. Particularly, in various embodiments of the present disclosure, since six switches are controlled at the same time to operate the continuous conduction mode boost power factor correction circuit and the phase shift full bridge converter, the vehicle charger may improve an output and can extend an input/output voltage range.

The present disclosure has been made with reference to only particular embodiments. However, it would be obvious to a person skilled in the art that various modifications and changes are possible within the technical idea of the present disclosure, provided by the accompanying claims.

What is claimed is:

1. A vehicle charger comprising:
   an inductor having a first end connected to a first end of an alternating current (AC) power source;
   a first leg comprising a first switching element and a second switching element, which are connected to each other in series, wherein connection terminals of the first switching element and the second switching element are connected to a second end of the inductor;
   a capacitor connected to the first leg in parallel;
   a second leg comprising a third switching element and a fourth switching element, which are connected to each other in series between both ends of the capacitor, wherein connection terminals of the third switching element and the fourth switching element are connected to a second end of the AC power source;
   a transformer, which has a primary coil having a first end connected to the connection terminals of the third switching element and the fourth switching element, and a secondary coil electromagnetically coupled to the primary coil;
   a third leg comprising a fifth switching element and a sixth switching element, which are connected to each other in series between both ends of the capacitor, wherein connection terminals of the fifth switching element and the sixth switching element are connected to a second end of the primary coil; and
   a controller configured to control the first and second switching elements in order to adjust a voltage of the capacitor, and configured to control the third and fourth switching elements in order to convert a magnitude of the voltage of the capacitor,
   wherein the controller generates a detection voltage of the capacitor and a first reference voltage for making the detection voltage of the capacitor obey an externally input voltage command for the capacitor, and
   the first reference voltage has a form of an alternating current synchronized with an alternating current of the AC power source.

2. The vehicle charger of claim 1, wherein, in order to adjust the voltage of the capacitor, the controller is further configured to:
   determine duty ratios of the first and second switching elements included in the first leg to control a turn-on/off of the first and second switching elements,
   control a turn-on/off of the third and fourth switching elements included in the second leg by using switching frequencies synchronized with switching frequencies of the first and second switching elements included in the first leg, and
   control a turn-on/off of the fifth and sixth switching elements included in the third leg such that the fifth and sixth switching elements have a phase difference therebetween, compared with the third and fourth switching elements included in the second leg.

3. The vehicle charger of claim 1, wherein the controller compares the first reference voltage with a carrier signal having a triangular wave-shaped voltage having a predetermined period to determine duty ratios of the first switching element and the second switching element, and
   the first switching element and the second switching element operate complementarily to each other.

4. The vehicle charger of claim 3, wherein the controller compares the carrier signal with a second reference voltage having a magnitude corresponding to half of a peak value of the carrier signal to determine duty ratios of the third switching element and the fourth switching element, and
   the third switching element and the fourth switching element operate complementarily to each other.

5. The vehicle charger of claim 4, wherein the controller determines a phase difference for making an output voltage of the vehicle charger obey a predetermined output voltage command, and controls the fifth switching element and the sixth switching element to be delayed by the phase difference, compared with the third switching element and the fourth switching element, respectively.

6. The vehicle charger of claim 1, wherein the controller comprises:
   a first subtractor configured to determine a first error between the detection voltage of the capacitor and the externally input voltage command for the capacitor;
   a first voltage controller configured to generate a direct current (DC) voltage control value for reducing the first error;
   a current command generator configured to generate a current command by multiplying the DC voltage control value, determined by the first voltage controller, by a phase component for a synchronization with the AC power source;
   a second subtractor configured to determine a second error between the current command and a detection current of the inductor;
   a current controller configured to determine a first reference voltage, which is used in determining the duty ratios of the first switching element and the second switching element of the first leg in order to reduce the second error and has a form of an alternating current synchronized with an alternating current of the AC power source;
   a triangular wave generator configured to generate a carrier signal, which is a triangular wave-shaped voltage having a predetermined period;
   a DC voltage source configured to generate a second reference voltage, which is a predetermined DC voltage having a magnitude corresponding to half of the peak value of the carrier signal;
   a first comparator configured to compare a magnitude of the first reference voltage with a magnitude of the carrier signal, determine the duty ratios of the first switching element and the second switching element, and to output the determined duty ratios as a control signal for the first switching element and the second switching element;
   a second comparator configured to compare a magnitude of the second reference voltage with a magnitude of the carrier signal, determine the duty ratios of the third switching element and the fourth switching element, and output the determined duty ratios as a control signal for the third switching element and the fourth switching element;

a third subtractor configured to determine a third error between an output voltage of the vehicle charger and a predetermined output voltage command;

a second voltage controller configured to generate a current peak command for reducing the third error;

a third comparator configured to output a result of comparison between a peak value of a primary-side current of the transformer and the current peak command; and a D flip-flop configured to delay an output of the second comparator based on an output of the third comparator and to output the output of the second comparator as a control signal for the fifth switching element and the sixth switching element.

7. The vehicle charger of claim 1, further comprising a rectifier connected to the secondary coil of the transformer, and configured to rectify power induced by the secondary coil and to output the rectified power to a device to be charged.

8. A method for controlling the vehicle charger of claim 1, the method comprising:

generating a detection voltage of the capacitor and a first reference voltage for making the detection voltage of the capacitor obey an externally input voltage command for the capacitor;

generating a second reference voltage which is a DC voltage having a predetermined magnitude;

comparing the first reference voltage with a carrier signal, which has a triangular wave-shaped voltage having a predetermined period, and determining duty ratios of the first switching element and the second switching element, which are opened/short-circuited complementarily to each other;

comparing the second reference voltage with the carrier signal and determining a turn-on/off state of the third switching element and the fourth switching element, which are opened/short-circuited complementarily to each other; and determining a phase difference for making an output voltage of the vehicle charger obey a predetermined output voltage command, delaying the turn-on/off state of the third switching element and the fourth switching element by the phase difference, and determining a turn-on/off state of the fifth switching element and the sixth switching element.

9. The method of claim 8, wherein the first reference voltage has a form of an alternating current synchronized with an alternating current of the AC power source.

10. The method of claim 8, wherein the second reference voltage is a DC voltage having a magnitude corresponding to half of a peak value of the carrier signal.

11. The method of claim 8, wherein the generating a first reference voltage comprises:

an operation of determining a first error between the detection voltage of the capacitor and the externally input voltage command for the capacitor;

a voltage control operation of generating a DC voltage control value for reducing the first error;

a current command generation operation of generating of an AC current command by multiplying the DC voltage control value determined in the voltage control operation by a phase component for the synchronization with the AC power source;

an operation of determining a second error between the current command and a detection current of the inductor; and a current control operation of determining the first reference voltage having a form of an alternating current synchronized with an alternating current of the AC power source in order to reduce the second error.

12. The method of claim 8, wherein, in the determining a turn-on/off state of the fifth switching element and the sixth switching element, in relation to a third error between the output voltage of the vehicle charger and the predetermined output voltage command, an output of the second comparator is delayed based on a result of comparison between a current peak command for reducing the third error and a peak value of a primary-side current of the transformer and is outputted as a control signal for the fifth switching element and the sixth switching element.

* * * * *